United States Patent
Martz et al.

(10) Patent No.: US 11,473,494 B1
(45) Date of Patent: Oct. 18, 2022

(54) METHODS AND SYSTEMS FOR TURBINE BYPASS

(71) Applicant: Ford Global Technologies, LLC, Dearborn, MI (US)

(72) Inventors: Jason Brian Martz, Canton, MI (US); Paul Joseph Tennison, West Bloomfield, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/220,630

(22) Filed: Apr. 1, 2021

(51) Int. Cl.
| | | |
|---|---|---|
| *F02B 37/18* | (2006.01) | |
| *F02D 23/00* | (2006.01) | |
| *F01N 3/20* | (2006.01) | |
| *F01D 17/10* | (2006.01) | |

(52) U.S. Cl.
CPC .......... *F02B 37/186* (2013.01); *F01D 17/105* (2013.01); *F01N 3/2006* (2013.01); *F02D 23/00* (2013.01); *F05D 2220/40* (2013.01); *F05D 2260/606* (2013.01); *F05D 2270/303* (2013.01)

(58) Field of Classification Search
CPC .... F02B 37/186; F01D 17/105; F01N 3/2006; F02D 23/00; F05D 2220/40; F05D 2260/606; F05D 2270/303
See application file for complete search history.

(56) References Cited

U.S. PATENT DOCUMENTS

| | | | |
|---|---|---|---|
| 9,835,082 B2 | 12/2017 | VanDerWege | |
| 9,932,886 B2 | 4/2018 | Lombard et al. | |
| 2002/0078934 A1 | 6/2002 | Hohkita et al. | |
| 2011/0011082 A1* | 1/2011 | Mehta | F02B 37/18 60/299 |
| 2011/0078998 A1* | 4/2011 | Eckert | F02D 41/405 60/299 |
| 2012/0144811 A1* | 6/2012 | Yamada | F02D 41/029 60/299 |
| 2012/0279216 A1* | 11/2012 | Otsuka | F02D 41/0245 60/602 |
| 2015/0219032 A1* | 8/2015 | Yamamoto | F01N 11/007 60/299 |
| 2015/0300243 A1* | 10/2015 | Myers | F01D 17/105 60/602 |
| 2016/0108798 A1* | 4/2016 | VanDerWege | F02B 37/12 60/602 |

* cited by examiner

*Primary Examiner* — Brandon D Lee
(74) *Attorney, Agent, or Firm* — Vincent Mastrogiacomo; McCoy Russell LLP (57) ABSTRACT

Methods and systems are provided for a turbocharger. In one example, a method may include bypassing exhaust gases flowing to the turbocharger in response to a catalyst temperature being less than a threshold temperature. The bypassing includes opening a bypass valve and adjusting a position of one or more turbine nozzle vanes.

17 Claims, 8 Drawing Sheets

METHODS AND SYSTEMS FOR TURBINE BYPASS

FIELD

The present description relates generally to adjusting a turbine bypass in response to conditions.

BACKGROUND/SUMMARY

Engines may use a turbocharger to improve engine torque and/or power output density. A turbocharger may include a turbine disposed in line with the engine's exhaust stream, and coupled via a drive shaft to a compressor disposed in line with the engine's intake air passage. The exhaust-driven turbine may then supply energy, via the drive shaft, to the compressor to boost the intake air pressure. In this way, the exhaust-driven turbine supplies energy to the compressor to boost the pressure and flow of air into the engine. Therefore, increasing the rotational speed of the turbine may increase boost pressure. The desired amount of boost may vary over operation of the engine. For example, the desired boost may be greater during acceleration than during deceleration.

One solution to control the boost pressure is the use of a variable geometry turbine in the turbocharger. A variable geometry turbine controls boost pressure by varying the flow of exhaust gas through the turbine. For example, exhaust gas may flow from the exhaust manifold through a turbine nozzle and to the turbine blades. The geometry of the turbine nozzle may be varied to control the angle that exhaust gas contacts the turbine blades and/or to vary the cross-sectional area of inlet passages, or throat, upstream of the turbine blades. Increasing the cross-sectional area of the inlet passages may allow more gas to flow through the passages. Furthermore, the angle of incidence of gas flowing across the turbine blades may affect the efficiency of the turbine, e.g., the amount of thermodynamic energy captured from the flow that is converted to mechanical energy. Thus, the turbine speed and boost pressure may be varied by changing the geometry of the turbine nozzle.

The design of variable geometry turbines has been modified to yield various desirable results. For example, U.S. Pat. No. 9,835,082 by Van Der Wege discloses systems and methods for operating a multi-scroll turbocharger. The multi-scroll turbocharger may include vanes for adjusting gas flow to scrolls of the turbines. The vanes are adjusted to optimize exhaust gas flows based on a desired turbine speed. Other examples in the art may include a wastegate or other form of bypass in combination with vanes to bypass exhaust gases around a single scroll turbine.

However, the inventors have identified some issues with the approach described above. For example, the turbine housing and blade may adsorb a high amount of heat during various conditions, which may prolong a catalyst warm-up or result in a catalyst temperature falling below a desired temperature. Operation of a wastegate during conditions where catalyst heating is desired may be insufficient as catalyst heating is prolonged and emissions increased during that time.

There are further issues to bypassing exhaust gases in turbine systems with one or more scrolls. Bypass modes thereof may introduce EGR shortfalls due to incorrect throttle positioning. Furthermore, previous methods for the bypass modes may not bypass a sufficient amount of exhaust gas around the turbine to block heat loss to the turbine and its housing. There is thus a demand for a bypass mode configured to rapidly heat an exhaust gas catalyst with minimal heat loss to a turbine housing while maintaining a desired engine combustion stability.

In one example, the issues described above may be addressed by a system for an engine comprising a twin-scroll turbocharger. The turbocharger is arranged upstream of a catalyst relative to a direction of exhaust gas flow. The system further includes a bypass configured to route exhaust gas away from the twin-scroll turbocharger. A plurality of vanes is configured to adjust an inlet size of a first scroll and a second scroll of the twin-scroll turbocharger. A controller comprising computer-readable instructions stored on non-transitory memory thereof that when executed enable the controller to adjust a position of a bypass valve and the plurality of vanes in response to a catalyst temperature being less than a threshold temperature. In this way, a catalyst temperature may be increased more rapidly via greater control of turbine bypassing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
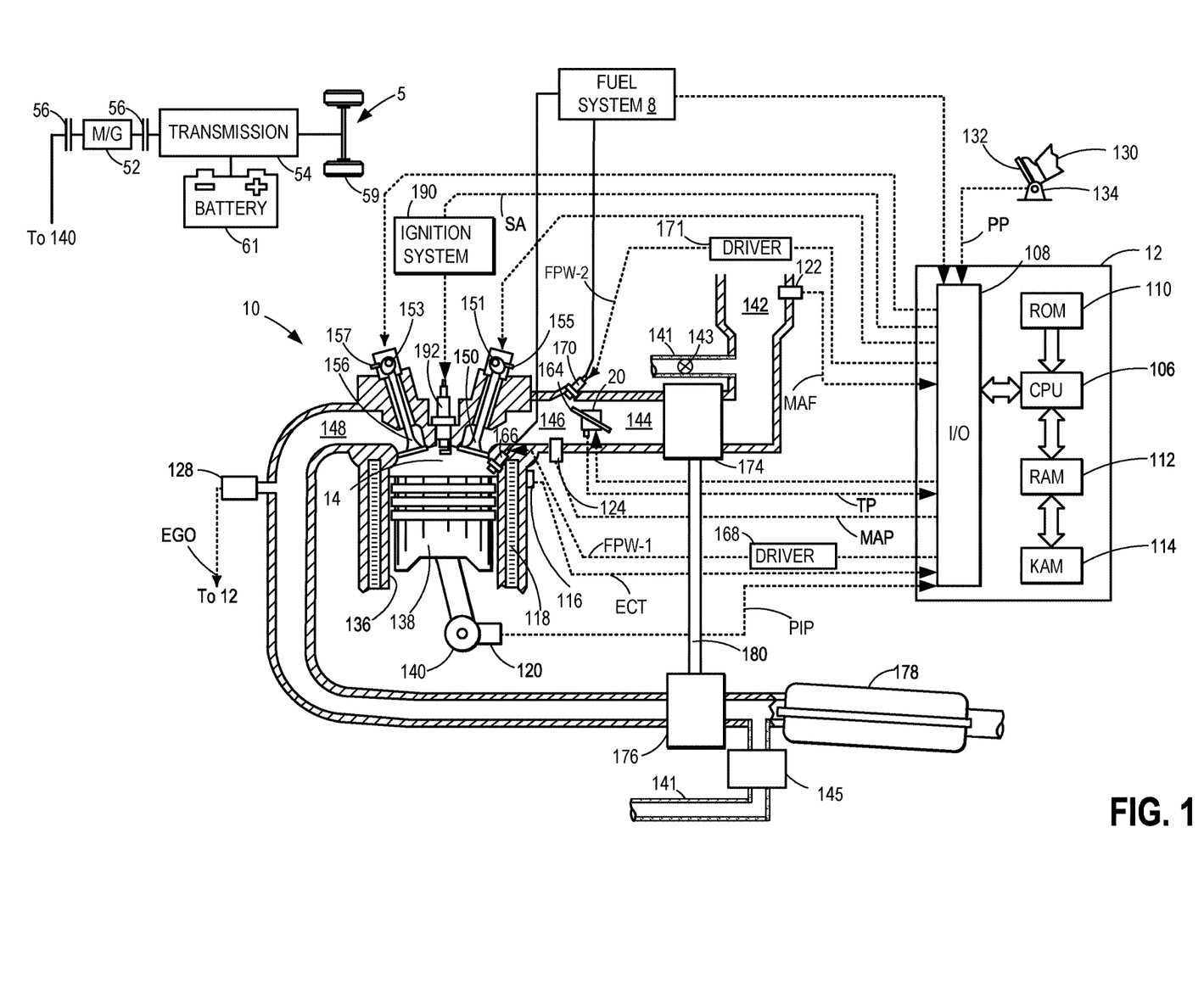
FIG. 1 shows an example of an engine in a hybrid vehicle.
Figure 2:
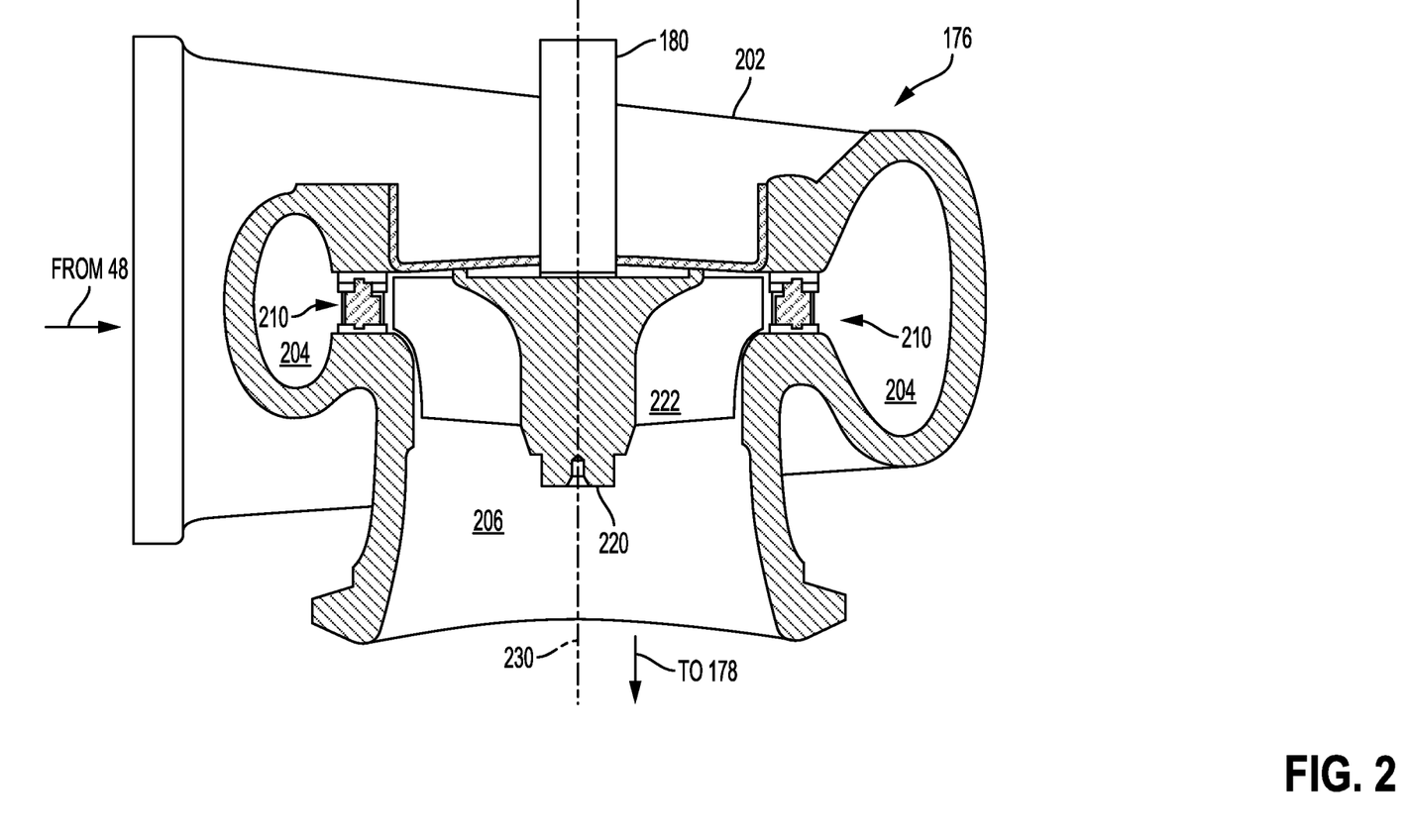
FIG. 2 shows a cross-section of an example embodiment of a turbine of a turbocharger of the engine of FIG. 1.
Figure 3:
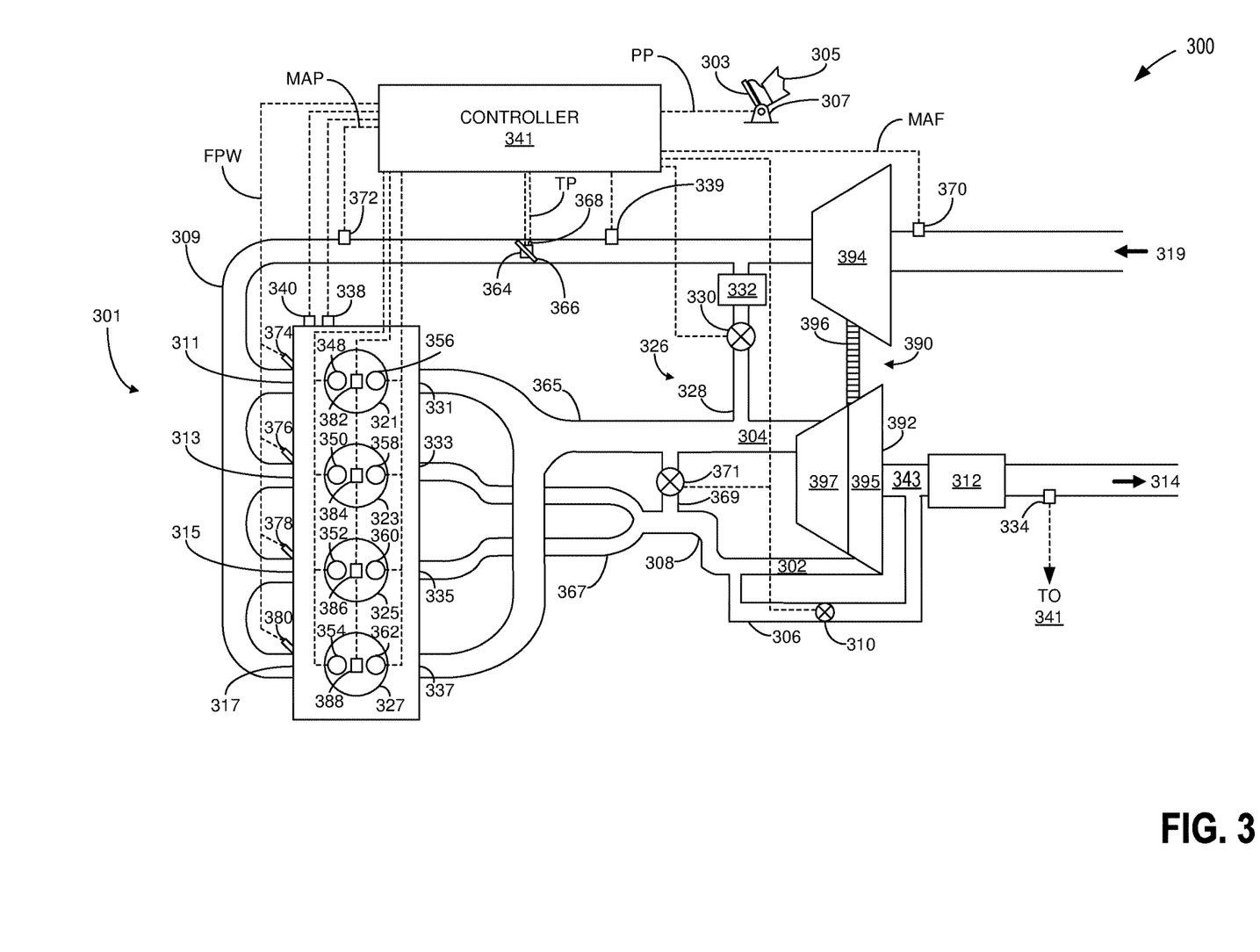
FIG. 3 shows a schematic depiction of a boosted engine system including a binary flow turbine.
Figure 4:
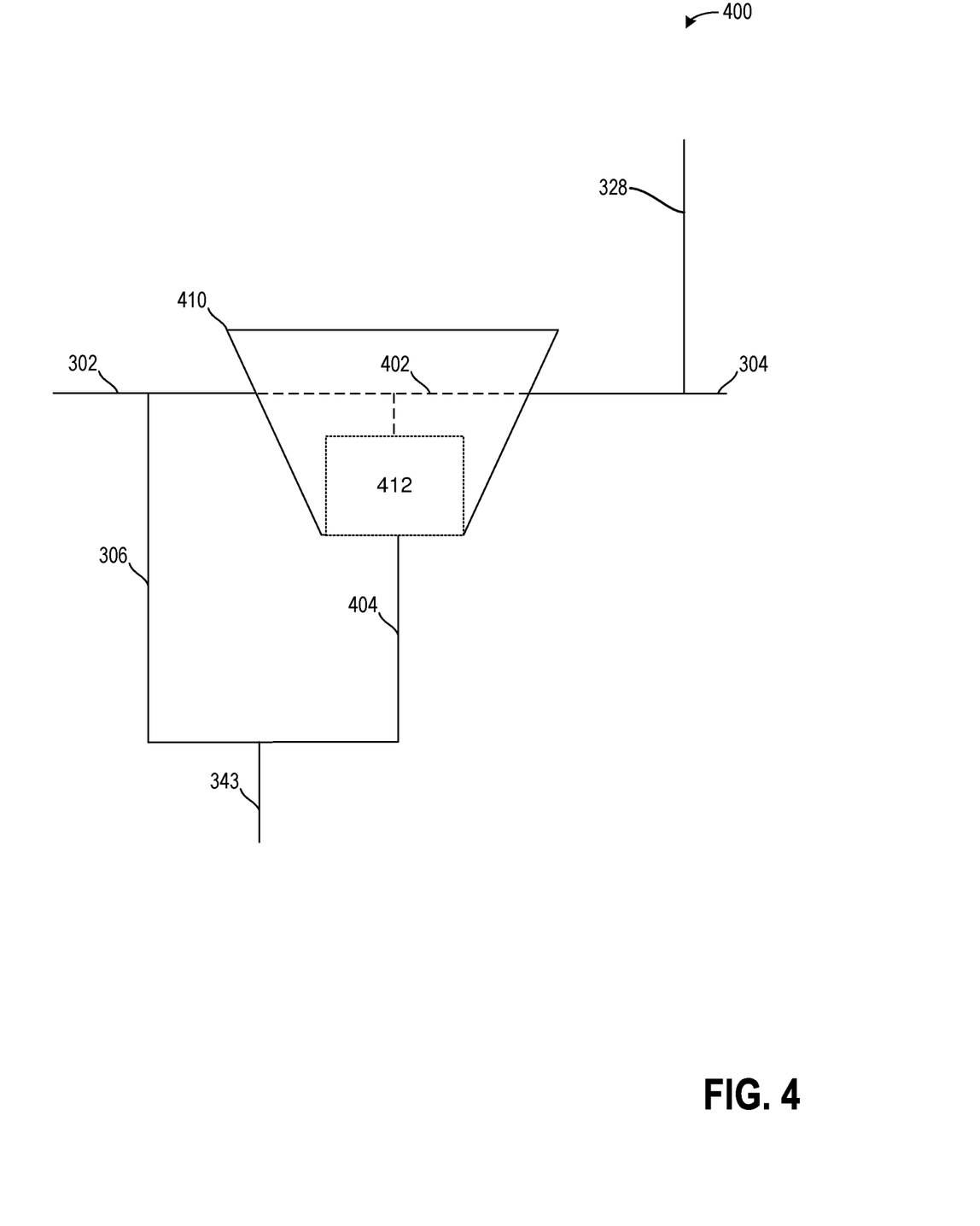
FIG. 4 shows a further example of a turbine of a turbocharger of the engine of FIG. 1.

The following description relates to adjusting operating parameters in response to a catalyst temperature. In one example, a bypass valve of a twin-scroll turbine is opened in response to the catalyst temperature being less than a threshold temperature. The catalyst may be arranged in an exhaust passage fluidly coupled to an engine, as shown in FIG. 1. The engine may include a turbocharger, including a turbine and a compressor. In one example, the turbine is a variable geometry turbine (VGT), as shown in FIG. 2. The turbine may be one of two or more turbines of a twin-scroll turbocharger, as shown in FIG. 3. A bypass valve, which may be arranged outside the turbine housing or within the housing as a wastegate, may be configured to bypass exhaust gases around impellers of the turbine. An example of a turbine including inlets for separate cylinder banks of an engine is shown in FIG. 4.

Figure 5:
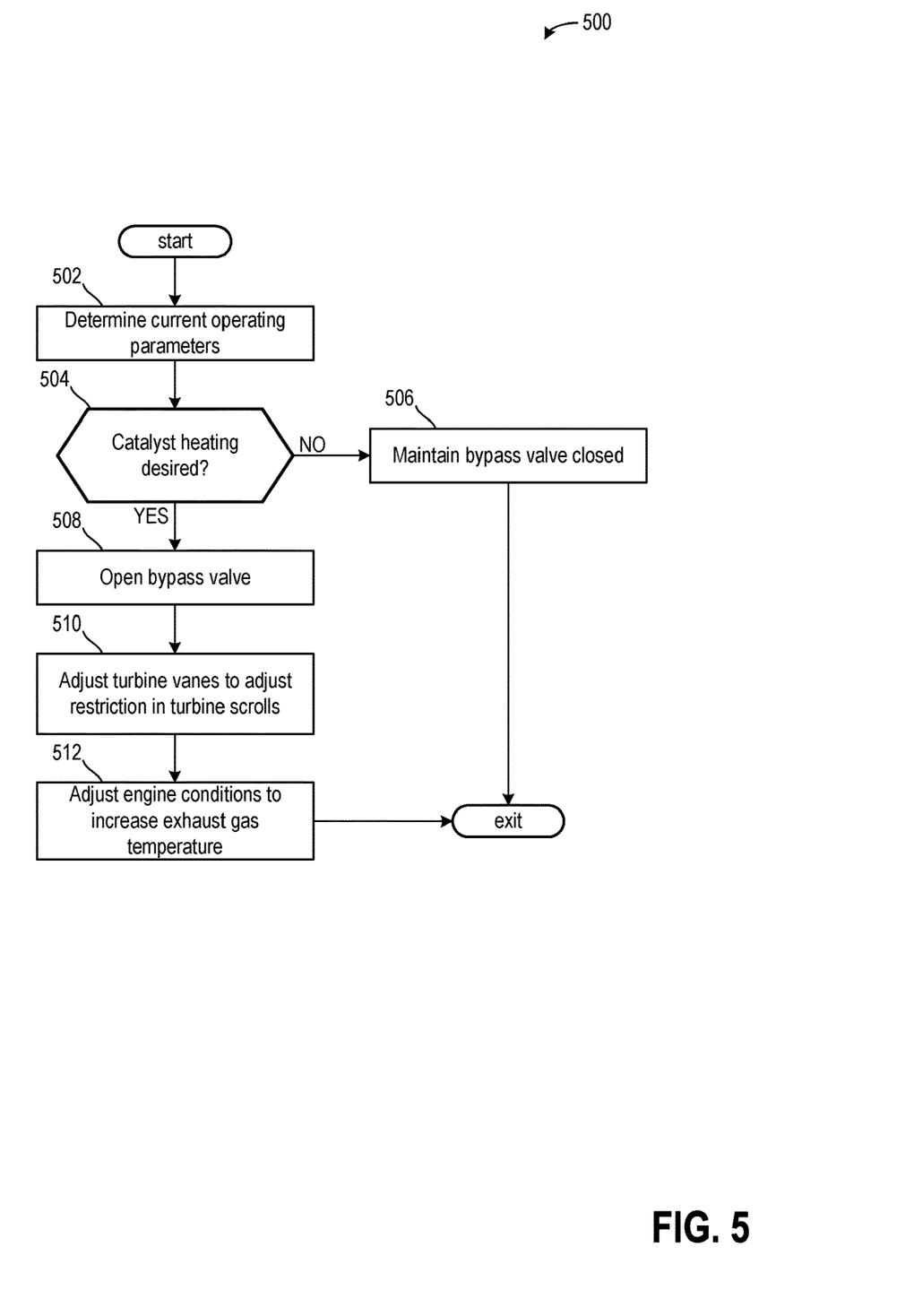
FIG. 5 shows a high-level flow chart for adjusting turbocharger operations in response to catalyst heating being desired.
Figure 6:
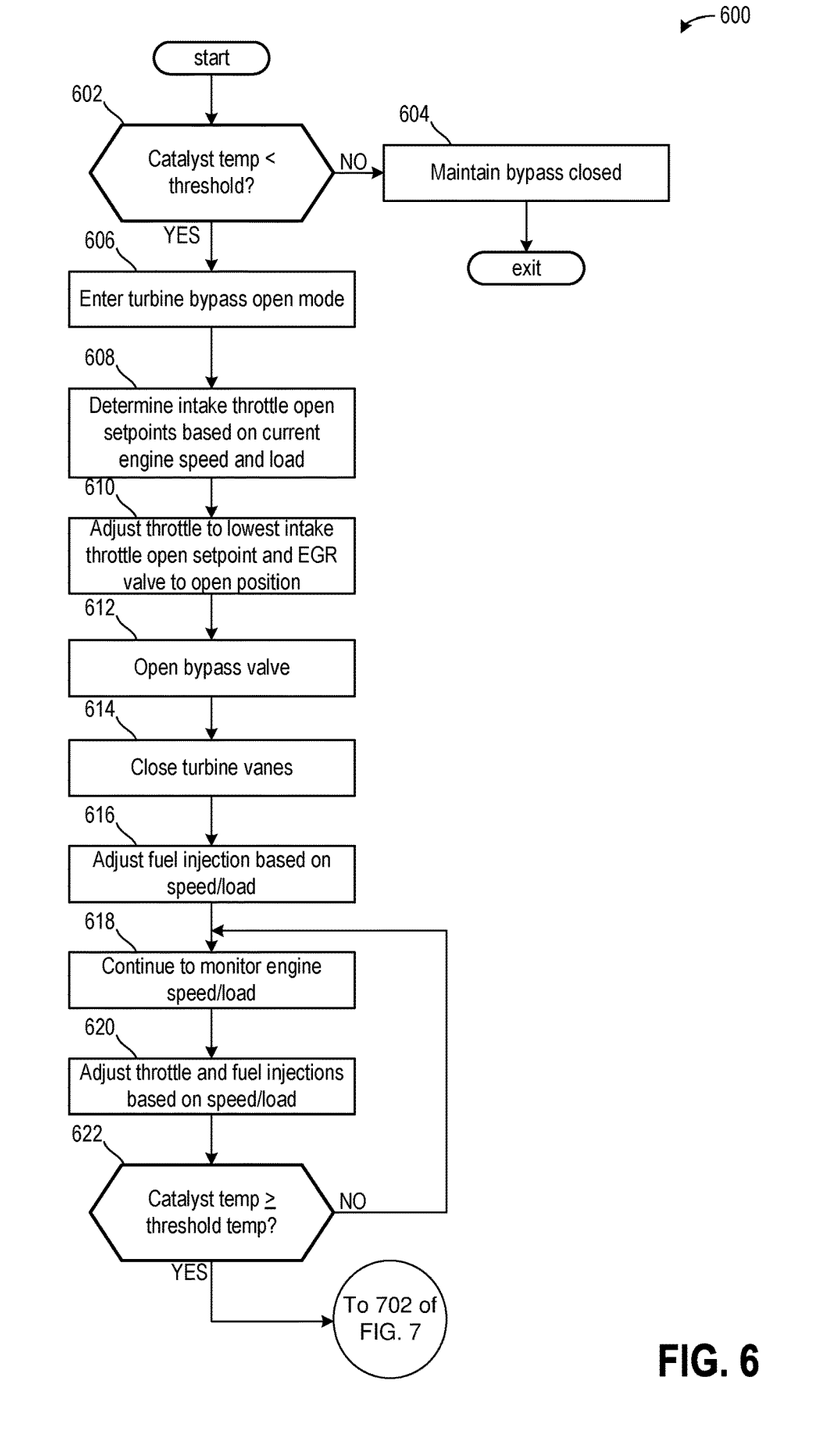
FIG. 6 shows a method for entering a turbine bypass open mode.
Figure 7:
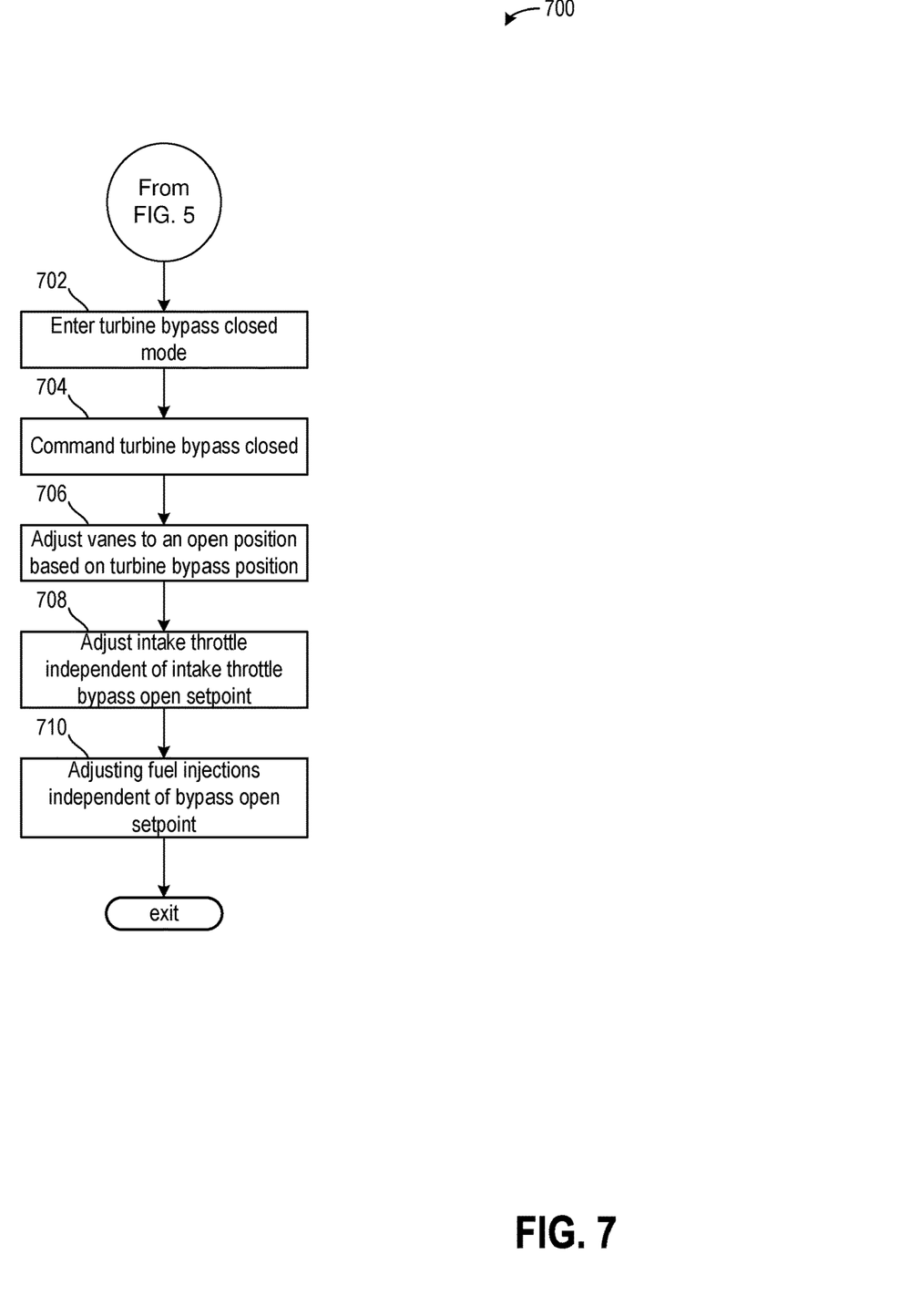
FIG. 7 shows a method for entering a turbine bypass closed mode following the turbine bypass open mode.
Figure 8:
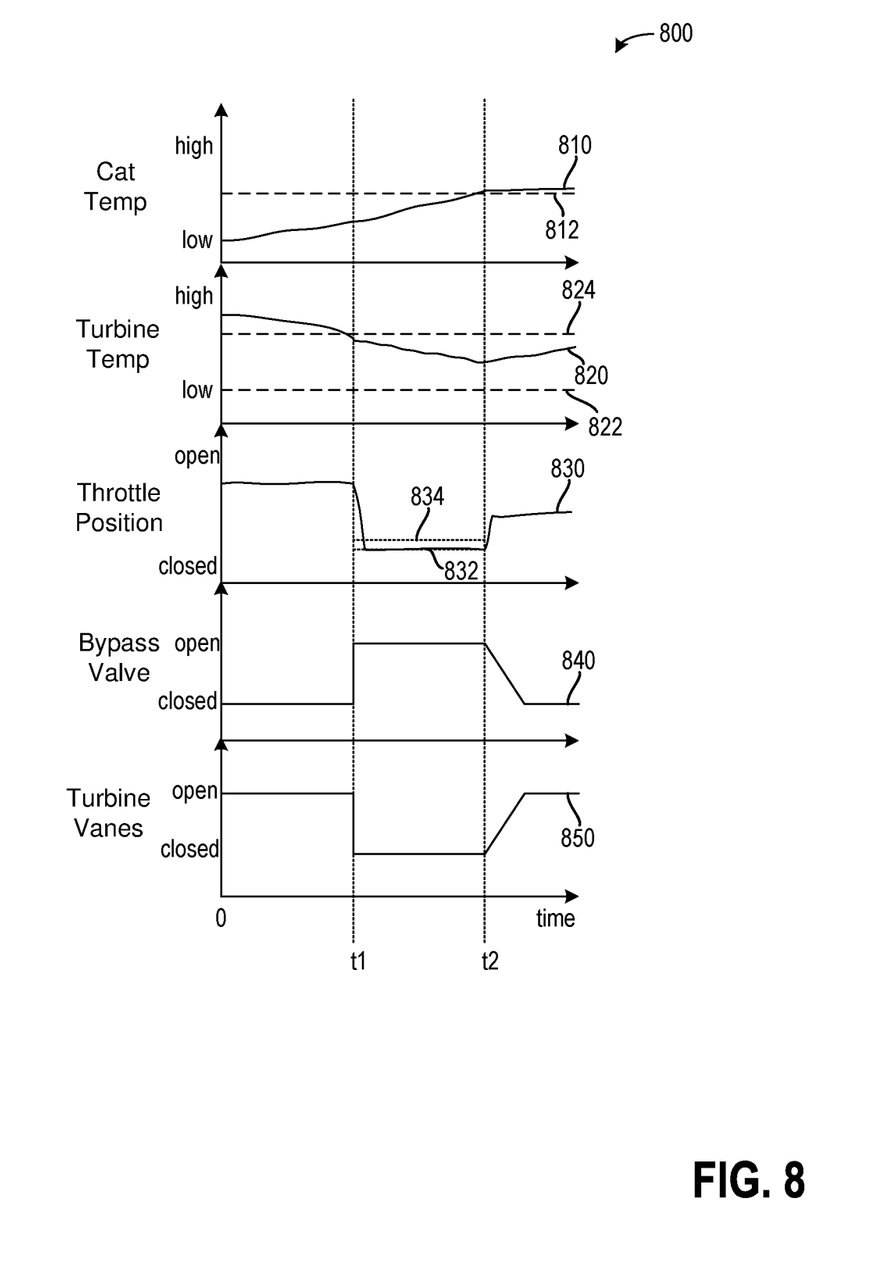
FIG. 8 graphically shows an engine operating sequence of the methods of FIGS. 6 and 7.

A method for heating a catalyst by bypassing one or more scrolls of a turbocharger is shown in FIG. 5. FIGS. 6 and 7 illustrate methods for executing a turbine bypass open mode and a turbine bypass closed mode, respectively. A prophetic example of an engine operating sequence illustrating engine conditions during the methods of FIGS. 6 and 7 is shown in FIG. 8.

Turning now to FIG. 1, it depicts an example embodiment of a combustion chamber or a cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. A throttle 20 including a throttle plate 164 may be provided along an intake passage of the engine for varying the flow rate and/or pressure of intake air provided to the engine cylinders. For example, throttle 20 may be disposed downstream of compressor 174, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three-way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different times from the port and direct injector. Furthermore, for a single combustion event, multiple injections of the delivered fuel may be performed per cycle. The multiple injections may be performed during the compression stroke, intake stroke, or any appropriate combination thereof. As described above, FIG. 1 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 144 may be varied by controller 12 via EGR valve 143. Further, an EGR sensor 145 may be arranged within the EGR passage and may provide an indication of one or more pressure, temperature, and concentration of the exhaust gas.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The flow of exhaust gases through turbine 176 may be further illustrated by the example embodiment of turbine 176 in FIG. 2. Components previously introduced may be identically numbered in this and subsequent figures. Turbine 176 may include a volute or housing 202 that encloses the turbine nozzle 210 and the turbine wheel 220 having turbine blades 222. For example, housing 202 may include an inlet passage 204 in communication with turbine nozzle 210. Thus, exhaust gas may flow from exhaust passage 148, through inlet passage 204, through the turbine nozzle 210, across the turbine wheel 220 and the turbine blades 222 into an outlet passage 206, and out to exhaust passage 148 toward the emission control device 178. Further, by varying the geometry of the turbine nozzle 210, the flow of exhaust gases, e.g. the expansion of gases, through turbine 176 may be regulated which may also control the rotational speed of turbine 176. The turbine nozzle 210 may be controlled and/or monitored via a signal line coupled with controller 12 (FIG. 1).

In one example, turbine nozzle 210 may be generally annular and share a central axis 230 with turbine wheel 220 and drive shaft 180. Turbine nozzle 210 may circumferentially surround the turbine wheel 220 and turbine blades 222, forming a ring around the turbine blades 222. In other words, turbine wheel 220 and turbine nozzle 210 may be coaxial and concentric.

In order to vary gas flow through a turbine nozzle, such as turbine nozzle 210 described above of FIG. 2, of a variable geometry turbine, the turbine nozzle may include a nozzle vane system comprising a plurality of sliding vanes and fixed vanes, arranged in the direct path of gas flow from the exhaust manifold to the turbine. The nozzle vane system comprises openings that may be narrowed or widened to govern the amount of flow reaching a turbine wheel based on a desired boost pressure to be delivered to an engine, such as engine 10 of FIG. 1. Additionally or alternatively, the nozzle vane system may be adjusted to block an opening of the inlet passage 204, such that exhaust gases are blocked from flowing to the turbine blades 222. Adjusting the nozzle vane system is described in greater detail below.

Turning now to FIG. 3, it shows a schematic diagram of a boosted engine system 300 including a binary flow or twin-scroll turbine 392, which may be included in a propulsion system of an automobile. Engine 301 may be controlled at least partially by a control system including controller 341 and by input from a vehicle operator 305 via an input device 303. In this example, input device 303 includes an accelerator pedal and a pedal position sensor 307 for generating a proportional pedal position signal PP. In one example, engine 301 may be used similarly to engine 10 of FIG. 1 and controller 341 may be used similarly to controller 12 of FIG. 1.

Engine 301 may include a plurality of combustion chambers (i.e., cylinders). In the example shown in FIG. 3, engine 301 includes combustion chambers 321, 323, 325, and 327, arranged in an in-line 4-cylinder configuration. It should be understood, however, that although FIG. 3 shows four cylinders, engine 301 may include any number of cylinders in any configuration, e.g., V-8, V-6, I-6, V-12, opposed 4, etc. FIG. 3 may also represent either of the two banks of a V-8 engine.

Each combustion chamber (i.e., cylinder) of engine 301 may include combustion chamber walls with a piston positioned therein (as shown in FIG. 1). The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 301.

Each combustion chamber may receive intake air from an intake manifold 309 via an air intake passage 319. Intake manifold 309 may be coupled to the combustion chambers via intake ports. For example, intake manifold 309 is shown in FIG. 3 coupled to cylinders 321, 323, 325, and 327 via intake ports 311, 313, 315, and 317, respectively. Each respective intake port may supply air and/or fuel to the respective cylinder for combustion.

Each combustion chamber may exhaust combustion gases via an exhaust port coupled thereto. For example, exhaust ports 331, 333, 335, 337 are shown in FIG. 3 coupled to cylinders 321, 323, 325, 327, respectively. Each respective exhaust port may direct exhaust combustion gases from a respective cylinder to an exhaust manifold or exhaust passage. In the present example, the exhaust manifold is a divided exhaust manifold wherein exhaust ports of selected cylinders direct exhaust to distinct exhaust manifolds. In the present depiction, exhaust ports 331 and 337 direct exhaust combustion gases of cylinders 321 and 327 to exhaust manifold segment 365 while exhaust ports 333 and 335 direct exhaust combustion gases of cylinders 323 and 325 to exhaust manifold segment 367. In alternate examples, each of exhaust ports 331, 333, 335, 337 may direct exhaust combustion gases from a respective cylinder to a common, undivided exhaust manifold. Each cylinder intake port can selectively communicate with the cylinder via an intake valve. For example, cylinders 321, 323, 325, and 327 are shown in FIG. 3 with intake valves 348, 350, 352, and 354, respectively. Likewise, each cylinder exhaust port can selectively communicate with the cylinder via an exhaust valve. For example, cylinders 321, 323, 325, and 327 are shown in FIG. 3 with exhaust valves 356, 358, 360, and 362, respectively. In some examples, each combustion chamber may include two or more intake valves and/or two or more exhaust valves.

Each intake and exhaust valve may be operated by an intake cam and an exhaust cam, as shown in FIG. 1. Alternatively, one or more of the intake and exhaust valves may be operated by an electromechanically controlled valve coil and armature assembly. The position of an intake cam may be determined by an intake cam sensor. The position of exhaust cam may be determined by an exhaust cam sensor. In this way, cylinders 321, 323, 325, 327 may be a non-limiting example of cylinder 14 of FIG. 1.

Intake passage 319 may include a throttle 364 having a throttle plate 366. In this particular example, the position of throttle plate 366 may be varied by controller 341 via a signal provided to an electric motor or actuator included with throttle 364, a configuration that is commonly referred to as electronic throttle control (ETC). In this manner, throttle 364 may be operated to vary the intake air provided the combustion chambers. The position of throttle plate 366 may be provided to controller 341 by throttle position signal TP from a throttle position sensor 368. Intake passage 319 may include a mass air flow sensor 370 and a manifold air pressure sensor 372 for providing respective signals MAF and MAP to controller 341.

In FIG. 3, fuel injectors are shown coupled directly to the combustion chambers for injecting fuel directly therein in proportion to a pulse width of a signal FPW received from controller 341 via an electronic driver, for example. For example, fuel injectors 374, 376, 378, and 380 are shown in FIG. 3 coupled to cylinders 321, 323, 325, and 327, respectively. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 309 in a configuration that provides what is known as port injection of fuel into the intake ports upstream of the respective combustion chambers. Though not shown in FIG. 3, fuel may be delivered to the fuel injectors by a fuel system including a fuel tank, a fuel pump, a fuel line, and a fuel rail.

The combustion chambers of engine 301 may be operated in a compression ignition mode, with or without an ignition spark. In some examples, a distributorless ignition system (not shown) may provide ignition sparks to spark plugs coupled to the combustion chambers in response to controller 341. For example, spark plugs 382, 384, 386, and 388 are shown in FIG. 3 coupled to cylinders 321, 323, 325, and 327, respectively.

Engine 301 may include a turbocharger 390. The turbocharger 390 may be a non-limiting example of the turbocharger of FIG. 1. Turbocharger 390 may include a turbine 392 and a compressor 394 coupled on a common shaft 396. The blades of the turbine 392 may be caused to rotate about the common shaft as a portion of the exhaust gas stream discharged from engine 301 impinges upon the blades of the turbine. The compressor 394 and turbine 392 are rotatably coupled to the common shaft 396 such that compressor 394 may be actuated when the blades of turbine 392 are caused to rotate. When actuated, compressor 394 may then direct pressurized gas to air intake manifold 309 from where it may then be directed to engine 301. In this way, turbocharger 390 may be configured for providing a boosted aircharge to the engine intake.

Turbocharger 390 may be configured as a multi-scroll turbocharger wherein the turbine includes a plurality of scrolls. In the depicted embodiment, turbine 392 includes two scrolls, a first scroll 395 and a second scroll 397. The first scroll may be an outer scroll while the second scroll may be an inner scroll. Alternatively, the scrolls may be positioned laterally relative to each other. The scrolls may be referred to as a high flow scroll and a low flow scroll, wherein the high flow scroll is the scroll that improves turbine response at high flow conditions, and wherein the low flow scroll is the scroll that improves turbine response at low flow conditions. In one example, the low flow scroll is the outer scroll while the high flow scroll is the inner scroll. In an alternate example, the low flow scroll is the inner scroll while the high flow scroll is the outer scroll.

Each scroll may receive exhaust gas from a distinct set of cylinder via distinct exhaust manifold segments and distinct inlets. Specifically, exhaust gas from cylinders 321 and 327 may flow along a second exhaust gas entry path 304 into second scroll 397 while exhaust from cylinders 323 and 325 flows along a first exhaust gas entry path 302 into first scroll 395. In addition, a conduit 369, with a communication valve 371, may couple exhaust manifold segment 365 with exhaust manifold segment 367 upstream of the turbine 392. In doing so, exhaust from all cylinders may be directed to each of the scrolls when desired.

In one example, the first scroll 395 and the second scroll 397 may be non-limiting examples of the turbine 176 of FIGS. 1 and 2. As such, each of the first scroll 395 and the second scroll 397 may include nozzle vanes configured to adjust based on a desired turbine speed and a desired exhaust gas flow rate. In one example, the nozzle vanes may move to a closed position, thereby sealing one or more of the first scroll 395 and the second scroll 397.

A bypass valve 310 may be coupled across turbine 392. Specifically, bypass valve 310 may be included in a bypass 308 coupled between an inlet and outlet of the exhaust turbine. By adjusting a position of bypass valve 310, an amount exhaust gas flowing around the turbine 392 may be adjusted. While the depicted example shows bypass 308 coupling exhaust manifold segment 367 to the outlet of the turbine 392, in an alternate example, bypass 308 may additionally or alternatively couple exhaust manifold segment 365 to the outlet of the turbine. However, to reduce packaging, vanes of the turbine 392 may be adjusted such that exhaust gases from the exhaust manifold segments 365 and 376 may each be routed through the bypass 308 such that all exhaust gas may be bypassed around the turbine 392 during some conditions.

Exhaust gases may also be recirculated from the one or both of the exhaust manifold segments 365, 367 (herein depicted being recirculated from only exhaust manifold segment 365) to intake passage 319 via an exhaust gas recirculation (EGR) passage 328. EGR passage 328 may include an EGR valve 330 for controlling an amount of EGR as well as an EGR cooler for controlling a temperature of the EGR delivered to the engine intake.

Exhaust gases exiting turbine 392 and/or bypass valve 310 may pass through an emission control device 312, which may be a non-limiting example of emission control device 178 of FIG. 1. Emission control device 312 can include multiple catalyst bricks, in one example. In one example, the emission control device 312 is arranged within a threshold distance of an interface between the bypass 308 and an exhaust passage 343. In one example, the threshold distance is based on a minimum distance allowed between the emission control device 312 and the interface. After passing through emission control device 312, exhaust gas may be directed to a tailpipe 314.

In some examples, controller 341 may be a conventional microcomputer including: a microprocessor unit, input/output ports, read-only memory, random access memory, keep alive memory, and a conventional data bus. Controller 341 is shown in FIG. 3 receiving various signals from sensors coupled to engine 301, in addition to those signals previously discussed, such as the sensors previously described in reference to FIG. 2. Based on the input from the various sensors, controller 341 may be configured to perform various control routines and actuate one or more engine actuators. The actuators may include, for example, intake throttle 364, EGR valve 320, bypass valve 310, and the turbine nozzle, in addition to the actuators previously described in reference to FIGS. 1 and 2.

For example, adjusting a position of the bypass valve 310 may include adjusting an actuator of the bypass valve to adjust exhaust gas flow away from the turbine 392. In one example, the position of the bypass valve 310 may be adjusted in response to a catalyst temperature, such as a temperature of emission control device 312, being less than a threshold temperature. Catalyst temperature may be sensed by a temperature sensor 334 arranged downstream of the emission control device 312. Feedback from the temperature sensor 334 may be sent to controller 341, which may be used to determine if adjustments to bypass valve 310 and turbine 392 operation are desired. In one example of the present disclosure, the controller may signal to an actuator of the turbine nozzle vanes to actuate the vanes to a fully closed position. The controller may then signal to the actuator of the bypass valve 310 to actuate the bypass valve 310 to a fully open position. As such, exhaust gases in the first and second entry paths 302 and 304 may be routed to the bypass 308 and away from turbine 392. In one example, fully closing the vanes and fully opening the bypass valve may result in all exhaust gas bypassing the turbine 392. Additionally or alternatively, the controller 341 may signal to an actuator of the EGR valve 330 to adjust a position thereof during the exhaust gas bypassing to heat the emission control device 312. Heating the emission control device 312 by bypassing the turbine 392 is described in greater detail below.

Turning now to FIG. 4, it shows an embodiment 400 of a turbine 410 including a first inlet fluidly coupled to the first exhaust gas entry path 302 and a second inlet fluidly coupled to the second exhaust gas entry path 304. The first inlet may receive exhaust gases from only a first cylinder bank including the cylinders 323 and 325 of FIG. 3 and the second inlet may receive exhaust gases from only a second cylinder bank including the cylinders 321 and 327 of FIG. 3. It will be appreciated that the cylinder banks may be configured differently without departing form the scope of the present disclosure. For example, the cylinder banks may be divided to include adjacent cylinders rather than outer and inner cylinders.

The turbine 410 includes an interconnecting passage 402 in which exhaust gases from the first and second inlets may mix prior to flowing to a turbine blade 412. During the catalyst heating mode, conditions may be adjusted to flow exhaust gases to the bypass 306, such as opening a bypass valve (e.g., bypass valve 310 of FIG. 3) and adjusting one or more vanes of the turbine blade 412 to block exhaust gas flow thereto. In one example, a pressure balance between the first inlet and the second inlet is adjusted to both promote a desired amount of EGR flow to the EGR passage 328 while also maintaining a pressure of the second inlet such that gases from the second inlet flow through the interconnecting passage 402, through the first inlet, and into the bypass 306. By doing this, exhaust gas flow through the turbine may be limited (e.g., blocked), and exhaust gases are routed around the turbine.

The pressure balance may be adjusted by adjusting a throttle position, such as throttle 364, which may directly or indirectly lead to an adjustment of EGR valve 330. By doing this, the EGR rate may be set, which may adjust the pressure of the second inlet. For example, more open EGR valve positions may correspond to lower second inlet pressures. Additionally, the bypass valve may be adjusted to adjust the pressure of the first inlet, wherein more open bypass valve positions may correspond to lower first inlet pressures. Thus, in one example, the EGR valve may be more closed than the bypass valve during the catalyst heating mode to allow gases from the second cylinder bank to mix with gases from the first cylinder bank in the bypass 306.

In the methods presented herein, embodiments of any of the FIGS. 1-4 may be used to executed the catalyst heating mode. Thus, the methods may be executed with a twin-scroll turbine (e.g., turbine 392 of FIG. 3) or a divided inlet turbine (e.g., turbine 410 of FIG. 4). FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 5, it shows a high-level flow chart of a method 500 for heating an exhaust catalyst. Instructions for carrying out method 500 and the rest of the methods included herein may be executed by a controller based on instructions stored on a memory of the controller and in conjunction with signals received from sensors of the engine system, such as the sensors described above with reference to FIGS. 1 and 3. The controller may employ engine actuators of the engine system to adjust engine operation, according to the methods described below. The methods described below may be executed in combination with one or more systems illustrated in FIGS. 1, 2, and 3 or 4.

The method 500 begins at 502, which includes determining, estimating, and/or measuring current operating parameters. Current operating parameters may include but are not limited to one or more of manifold vacuum, throttle position, engine speed, engine temperature, exhaust gas temperature, EGR flow rate, exhaust gas flow rate, and an air/fuel ratio.

The method 500 may proceed to 504, which includes determining if a catalyst heating is desired. Catalyst heating may be desired if a temperature of a catalyst is less than a threshold temperature. In one example, the catalyst may be identical to emission control device 312 of FIG. 3, wherein feedback from the temperature sensor may be used to estimate a temperature of the catalyst. In one example, feedback from the temperature sensor may be input into a look-up table, wherein a catalyst temperature corresponding to the feedback may be an output of the look-up table. The catalyst temperature may be compared to the threshold temperature, wherein heating may be desired if the catalyst temperature is less than the threshold temperature. The threshold temperature may be a non-zero, positive number. In one example, threshold temperature is based on a light-off temperature of the catalyst.

Catalyst heating may further include one or more entry conditions, such as an air/fuel ratio being above a threshold ratio. The threshold ratio may be based on a highest amount of emission tolerable along with a combustion stability. This may be due to mass air flow rates and boost decreasing during a catalyst heating as will be elaborated below.

Another example entry condition may include where boost demand is below a threshold demand. In one example, the threshold demand is based on less than a maximum capacity of the twin-scroll turbine. In some examples, additionally or alternatively, the threshold demand may be based on half of the maximum capacity. In other examples, additionally or alternatively, the threshold demand may be zero. As such, an accelerator pedal may not be further depressed during the catalyst heating.

If catalyst heating is not desired, then the method 500 may proceed to 506, which includes maintaining a bypass valve closed. As such, exhaust gases may flow to one or more of the first and second scrolls of the turbine. Thus, the controller may not signal to an actuator of the bypass valve to adjust the bypass valve outside of the closed position.

If catalyst heating is desired, then the method 500 may proceed to 508, which includes opening the bypass valve. In one example, opening the bypass valve may include where the controller signals to the actuator of the bypass valve to overcome a spring or other resistant element thereof and move the bypass valve to an at least partially open position. In one example, the controller may signal to the actuator to open the bypass valve to a fully open position. In some examples, the bypass valve may be adjustable to only a fully closed position or a fully open position, which may decrease a cost and a complexity of the bypass valve relative to a variable position controlled bypass valve. In other examples, additionally or alternatively, the bypass valve may be adjustable to the fully closed position, the fully open position, or to positions therebetween, while this may increase a manufacturing cost, greater fine tuning of exhaust flow around the turbine may be achieved, which may increase fuel economy and reduce emissions.

By bypassing exhaust gases around the turbine, mass air flow rates are reduced due to reduced enthalpy to the turbine. As described above, entry conditions to the catalyst heating may include where the boost demand is reduced. Furthermore, an intake throttle, in combination with an EGR valve, may be adjust to meet a minimum air/fuel ratio demand during the catalyst heating to reduce emissions and maintain combustion stability. Adjusting of the intake throttle and the EGR valve are described in greater detail below.

The method 500 may proceed to 510, which includes adjusting turbine vanes to adjust a restriction of the turbine scrolls. The vanes may be adjusted to block at least a portion of a scroll inlet via a signal sent from a controller to an actuator thereof. In one example, a plurality of first vanes adjust an inlet opening of a first scroll and a plurality of second vanes adjust an inlet opening of a second scroll. A first, single actuator may be configured to actuate each of the plurality of first vanes and a second, single actuator may be configured to actuate each of the plurality of second vanes, thereby reducing a manufacturing cost relative to actuating each vane individually. Additionally or alternatively, each vanes of the pluralities of first and second vanes may be actuated via a corresponding actuator such that each vane may be individually actuated, thereby providing greater flow control within the turbine. In one example, the vanes are adjusted to fully close inlets of the first and second scrolls such that exhaust gas bypasses each of the scrolls and flow directly to the catalyst. As another example, additionally or alternatively, vanes of only the first scroll may be actuated to a fully closed position such that exhaust gases from one bank of the engine may continue to flow to the second scroll while exhaust gases from another bank bypass the first scroll and flow directly to the catalyst. As such, an amount of boost demand may continue to be met during the catalyst heating. Additionally or alternatively, the plurality of second vanes may be more open than the plurality of first vanes in response to a difference between the temperature of the catalyst and the threshold temperature, wherein as the difference increases, the second vanes are opened to a greater magnitude.

The method 500 may proceed to 512, which includes adjusting engine conditions to increase exhaust gas temperatures. In one example, the engine is a diesel engine, wherein one or more of a commanded fuel mass and a fuel injection timing are adjusted. For example, the commanded fuel mass may be reduced due to the reduced intake mass air flow while the fuel injection timing is retarded to increase a temperature of exhaust gas flowing to the catalyst. By doing this, the catalyst heating may proceed more rapidly. Reduction of the commanded fuel mass and retardation of the injection timing may occur in balance with a combustion stability. In one example, the commanded fuel mass is reduced to a minimum value and the injection timing is retarded to a maximum value based on the combustion stability for a current engine speed and engine load.

In some examples, additionally or alternatively, the engine may be a spark-ignited engine. As such, ignition timing may be adjusted (e.g., retarded) in combination with the retarded fuel injection timing. Additionally or alternatively, the fuel injection timing may not be retarded while the ignition timing is retarded.

Turning now to FIG. 6, it shows a method 600 for executing a turbine bypass open mode. The method 600 begins at 602, which includes determining if a catalyst temperature is less than the threshold temperature. As described above, the threshold temperature may be based on a light-off temperature of the catalyst. The catalyst temperature may be estimated based on feedback from a temperature sensor input into a look-up table correlating exhaust gas temperatures downstream of the catalyst to the catalyst temperature.

If the catalyst temperature is not less than (e.g., greater than or equal to) the threshold temperature, then the method 600 may proceed to 604, which includes maintaining the bypass valve closed, similar to 506 of method 500 of FIG. 5.

If the catalyst temperature is less than the threshold temperature, then the method 600 may proceed to 606, which includes entering a turbine bypass open mode. The turbine bypass open mode may include adjusting one or more operating conditions of the engine to enhance entry conditions and operating conditions of the turbine bypass mode.

The method 600 may proceed to 608, which includes determining intake throttle open setpoints at a current engine speed and/or a current engine load. The intake throttle open setpoints may be based on one or more of an engine delta pressure, an EGR flow rate, and a $NO_x$ output through a tailpipe. In one example, a relatively constant manifold absolute pressure (MAP) may be desired to provide a desired EGR flowrate. The EGR flow rate may correspond to a relatively small range of MAPs, wherein the small range of MAPs correspond to intake throttle setpoints. Additionally or alternatively, the intake throttle open setpoints may be based on a range of positions in which emissions are less than a threshold level and combustion stability is greater than a threshold stability for a current engine speed and load during the turbine bypass open mode. The threshold level of emissions may be based on a local governing body standard and is a non-zero, positive number. The threshold stability may be based on a desired combustion stability, wherein stabilities less than the threshold stability may result in knock, misfire, or the like.

The method 600 may proceed to 610, which includes adjusting the throttle to a lowest intake throttle open setpoint. That is to say, the throttle may be actuated to a minimum open position of the intake throttle open setpoints (e.g., a least open position of the setpoints) to allow a desired EGR flow rate to be maintained during the turbine bypass open mode while meeting emissions and combustion stability conditions. In this way, the delta pressure across the engine, which is based on the throttle position, engine speed, and engine load, may be sufficiently low to maintain a desired EGR flow rate during the turbine bypass open mode. The EGR valve may be further adjusted to an open position based on an EGR desired flow rate. In one example, the EGR desired flow rate is based on a $NO_x$ production during the turbine bypass open mode, wherein the EGR desired flow rate may increase as the $NO_x$ production increases.

In some examples, additionally or alternatively, the throttle may be mechanically linked to the EGR valve such that actuation of one may result in actuation of the other. Such an example may include a chained single actuator, wherein the EGR valve and the throttle are used in tandem to control the EGR flow rate. Thus, a controller may signal to the chained single actuator to actuate the throttle, wherein actuation of the throttle results in a changed position of each of the throttle and the EGR valve.

The method 600 may proceed to 612, which includes opening the bypass valve, as described above with respect to 508 of method 500 of FIG. 5.

The method 600 may proceed to 614, which includes closing the turbine vanes. In one example, the bypass valve is actuated to a fully open position and the turbine vanes are actuated to a fully closed position to increase an amount of exhaust gas bypassing the turbine. In some examples, additionally or alternatively, this may maximize an amount of exhaust gas bypassing the turbine, wherein 80% or greater of exhaust gas produced by the engine may be bypassed around the turbine. In one example, the turbine vanes may already be in a more closed position due to the elevated EGR demand during the turbine bypass open mode.

In some examples of the method 600, a position of one or more of the vanes and/or the bypass valve may be adjusted during the turbine bypass open mode in response to a boost demand being present while the catalyst temperature is less than the threshold temperature. As described above, the first scroll may include a plurality of first vanes and the second scroll may include a plurality of second vanes. If the boost demand is present, the plurality of first vanes and/or the plurality of second vanes may be adjusted to allow exhaust gases to flow therethrough. The turbine nozzle vanes may be continually opened until the boost demand is met. In one example, the plurality of vanes corresponding to the turbine scroll furthest from the bypass is opened initially in response to the boost demand, which may provide a more reliable exhaust flow through the corresponding scroll during the turbine bypass open mode.

The method 600 may proceed to 616, which includes adjusting fuel injection conditions based on the engine speed and/or the engine load. In one example, the fuel injection conditions are adjusted based on $NO_x$ emissions. In one example, a fuel injection volume is reduced to decrease $NO_x$ production. Additionally or alternatively, if $NO_x$ production is less than a threshold production, then the fuel injection volume may increase in response to an increased driver demand. Furthermore, the fuel injection conditions may be adjusted to increase exhaust gas temperatures, such as retarding a fuel injection timing, increasing a post-injection fuel mass, and the like. The method 600 may proceed to 618, which includes continuing to monitor engine speed and engine load.

The method 600 may proceed to 620, which includes adjusting a throttle position and fuel injection conditions based on the engine speed and the engine load. As such, the emissions and combustion stability conditions based on engine speed and engine load during the turbine bypass open mode may continue to be met while also satisfying a desired EGR flow rate.

The method 600 may proceed to 622, which includes determining if the catalyst temperature is greater than or equal to the threshold temperature. If the catalyst temperature is not greater than or equal to the threshold temperature, then the method may continue to monitor the engine speed and/or load and adjust the throttle position and fuel injections based on the engine speed and engine load.

If the catalyst temperature is greater than or equal to the threshold temperature, then the catalyst may be sufficiently heated and the method 600 may proceed to 702 of FIG. 7.

Turning now to FIG. 7, it shows a method 700 for executing a turbine bypass closed mode. The method 700 begins at 702, following YES from 622 of method 600 of FIG. 6, which includes entering the turbine bypass closed mode. The turbine bypass closed mode may include adjusting conditions configured during the turbine bypass open mode of method 600 of FIG. 6 as the bypass valve closes and the throttle vanes open.

The method 700 may proceed to 704, which includes commanding the turbine bypass valve closed. In one example, the controller may no longer power an actuator of the turbine bypass valve, which may result in a return force of a spring or other resilient member to force the bypass valve to a fully closed position. As such, gases may no longer flow through the bypass.

The method 700 may proceed to 706, which includes adjusting the turbine nozzle vanes to an at least partially open position. The vanes may be opened as the bypass valve is closing to mitigate a pressure overshoot as an amount of exhaust gas being bypassed decreases and a turbine speed increases. In one example, a magnitude of the vanes opening may be proportional to a magnitude of the bypass valve closing in combination with a present exhaust gas flow mass. For example, as the bypass valve moves to a more closed position, the vanes may move to a more open position.

The method 700 may proceed to 708, which includes adjusting the throttle position independent of the bypass valve position. The throttle position may be adjusted based on one or more of pedal position, desired air/fuel ratio, driver demand, combustion stability, and the like.

The method 700 may proceed to 710, which includes adjusting a fuel injector operation independent of the bypass valve position. The fuel injector operation may be adjusted based on one or more of pedal position, desired air/fuel ratio, driver demand, throttle position, combustion stability, and the like.

Turning now to FIG. 8, it shows a graph 800 illustrating various engine operating conditions being adjusted during a turbine bypass open mode of method 600 of FIG. 6 and a transition from the turbine bypass open mode to a turbine bypass closed mode of method 700 of FIG. 7. Plot 810 illustrates a catalyst temperature and dashed line 812 illustrates a threshold catalyst temperature. Plot 820 illustrates a turbine temperature, dashed line 822 illustrates a lower threshold turbine temperature, and dashed line 824 illustrates an upper threshold turbine temperature. Plot 830 illustrates a throttle position, dashed line 832 illustrates a lower end of an open setpoint range, and dashed line 834 illustrates an upper end of the open setpoint range. Plot 840 illustrates a bypass valve position. Plot 850 illustrates a position of turbine nozzle vanes. Time increases along an abscissa from a left to right of the figure.

Prior to t1, the catalyst temperature is less than the threshold catalyst temperature (plot 810 and dashed line 812). As described above, the threshold catalyst temperature may be based on a light-off temperature of the catalyst. The turbine temperature (plot 820) is greater than an upper threshold turbine temperature (dashed line 824). In one example, the upper threshold turbine temperature is a non-zero, positive value. The upper threshold turbine temperature may be equal to an exhaust gas temperature. As such, the turbine may heat exhaust gases flowing therethrough. In one example, the turbine temperature may be greater than the exhaust gas temperature during a tip-out. As such, the turbine bypass open mode may not be initiated in response to the catalyst temperature being less than the threshold catalyst temperature if the turbine temperature is higher than an exhaust gas temperature. In this way, higher turbine temperature may be utilized to heat the catalyst without executing the turbine open bypass mode. Thus, the throttle position (plot 830) may be maintained based on a desired dilution or a driver demand. The bypass valve is maintained in a fully closed position (plot 840). The turbine nozzle vanes may be fully open (plot 850) such that exhaust gases may flow to each of the turbine scrolls.

At t1, the turbine temperature decreases to a temperature less than the exhaust gas temperature. Thus, the turbine and its housing may no longer heat the exhaust gas. The catalyst temperature is still below the threshold catalyst temperature and as a result, the turbine bypass open mode is initiated.

Between t1 and t2, the bypass valve is moved to a fully open position and the turbine nozzle vanes are moved to a fully closed position. By doing this, the catalyst temperature may increase toward the threshold catalyst temperature and the turbine temperature may decrease toward the lower threshold turbine temperature. In one example, the lower threshold turbine temperature is based on a desired operating temperature of turbine. In one example, the turbine bypass open mode may be exited in response to turbine temperature decrease below the lower threshold turbine temperature. The throttle position may be adjusted to a more closed position based on a minimum open setpoint of a setpoint range spanning from dashed line 832 to 834, wherein the setpoint range is based on a desired EGR flow rate during the turbine bypass open mode in combination with an emission limit and combustion stability during a current engine speed and a current engine load.

At t2, the catalyst temperature reaches the threshold catalyst temperature. As such, the turbine bypass open mode may be terminated and a transition to the turbine bypass closed mode may begin. After t2, the bypass valve may be moved to the fully closed position. The turbine vanes may be moved to the fully open position in conjunction with the bypass valve adjustment. The turbine temperature may begin to increase as exhaust gas flow through the scrolls of the turbine. The throttle position may be adjusted independent of the bypass valve position.

In this way, a turbine may be configured to bypass exhaust gases during conditions where catalyst heating may be desired, such as during a cold-start or other conditions. The turbine may include a bypass and a plurality of vanes configured to adjust exhaust gas flow to scrolls of the turbine. The technical effect of adjusting a bypass valve of the bypass and the plurality of vanes is to increase an amount of exhaust gas bypassed, which may increase a rate of heating of the catalyst. By doing this, emissions may be reduced.

An embodiment of a system, comprises an engine comprising a twin-scroll turbocharger upstream of a catalyst relative to a direction of exhaust gas flow, a bypass configured to route exhaust gas away from the twin-scroll turbocharger, a plurality of vanes configured to adjust an inlet size of a first scroll and a second scroll of the twin-scroll turbocharger, a controller comprising computer-readable instructions that when executed enable the controller to adjust a position of a bypass valve and the plurality of vanes in response to a catalyst temperature being less than a threshold temperature. A first example of the system further includes where the plurality of vanes includes a plurality of first vanes configured to adjust the inlet size of the first scroll and a plurality of second vanes configured to adjust the inlet size of the second scroll. A second example of the system, optionally including the first example, further includes where the instructions enable the controller to close the plurality of first vanes and the plurality of second vanes in response to the catalyst temperature being less than the threshold temperature. A third example of the system, optionally including one or more of the previous examples, further includes where the bypass valve is arranged in the bypass, and wherein the bypass branches off an exhaust manifold segment upstream of a first exhaust gas entry path configured to flow exhaust gases to the first scroll. A fourth example of the system, optionally including one or more of the previous examples, further includes where an exhaust gas recirculate passage branches from a second exhaust gas entry path configured to flow exhaust gases to the second scroll. A fifth example of the system, optionally including one or more of the previous examples, further includes where the instructions further enable the controller to maintain the bypass valve closed in response to a turbine temperature being higher than an upper turbine temperature and the catalyst temperature being less than the threshold temperature.

An embodiment of a method for operating an engine, comprises flowing exhaust through a first scroll of a turbocharger, flowing exhaust through a second scroll of the turbocharger, and flowing exhaust through a turbine bypass passage of the turbocharger in response to a temperature of a catalyst via adjusting a position of turbine nozzle vanes of one or more of the first scroll and the second scroll. A first example of the method further includes where flowing exhaust through the turbine bypass passage comprises actuating a turbine bypass valve to an open position. A second example of the method, optionally including the first example, further includes where adjusting the position of turbine nozzle vanes of one or more of the first scroll and the second scroll includes adjusting one or more of a plurality of first nozzle vanes and a plurality of second nozzle vanes to an open position based on the temperature of the catalyst and a boost demand. A third example of the method, optionally including one or more of the previous examples, further includes where flowing exhaust through the turbine bypass passage comprises adjusting a throttle position and an exhaust gas recirculate (EGR) valve position, wherein the throttle position is adjusted to a minimum open setpoint position of a range of positions based on a desired air/fuel ratio and a desired EGR flow rate. A fourth example of the method, optionally including one or more of the previous examples, further includes where flowing exhaust through the turbine bypass passage further includes adjusting fuel injection conditions. A fifth example of the method, optionally including one or more of the previous examples, further includes where adjusting fuel injection conditions includes decreasing a commanded fuel injection volume in response to an amount of $NO_x$ generated. A sixth example of the method, optionally including one or more of the previous examples, further includes where adjusting fuel injection conditions includes retarding a fuel injection timing. A seventh example of the method, optionally including one or more of the previous examples, further includes where flowing exhaust through the turbine bypass passage includes where the temperature of the catalyst is less than a threshold temperature. An eighth example of the method, optionally including one or more of the previous examples, further includes where transitioning from flowing exhaust through the turbine bypass passage to blocking exhaust from flowing through the turbine bypass passage in response to the temperature of the catalyst being greater than or equal to the threshold temperature.

An embodiment of an engine system, comprises an engine comprising a first group of cylinders configured to flow exhaust gases to a first scroll of a turbine and a second group of cylinders configured to flow exhaust gases to a second scroll of the turbine, a turbine bypass passage comprising a bypass valve configured to adjust an amount of exhaust gases bypassing from the first and second scrolls, and a controller with computer-readable instructions that when executed enable the controller to flow exhaust gas from the first group of cylinders to the first scroll and from the second group of cylinders to the second scroll in response to a temperature of a catalyst being greater than or equal to a threshold temperature, and bypass exhaust gas via opening the bypass valve in response to the temperature of the catalyst being less than the threshold temperature. A first example of the method further includes where the instructions further enable the controller to bypass exhaust gas from only the first group of cylinders by actuating a plurality of first vanes of the first scroll to a closed position, and where exhaust gas from the second group of cylinders flows to the second scroll via a plurality of second vanes in an open position. A second example of the method, optionally including the first example, further includes where the instructions further enable the controller to determine an air/fuel ratio entry condition is met prior to opening the bypass valve, wherein the air/fuel ratio entry condition is based on a combustion stability and an emission limit. A third example of the method, optionally including one or more of the previous examples, further includes where the instructions further enable the controller to determine a throttle position range based on the air/fuel ratio entry condition, an engine speed, and an engine load, and wherein the instructions further enable the controller to signal to an actuator to adjust the throttle position to a least open position of the throttle position range. A fourth example of the method, optionally including one or more of the previous examples, further includes where the instructions further enable the controller to block exhaust gas from bypassing the turbine in response to the temperature of the catalyst being greater than or equal to the threshold temperature, wherein the temperature of the catalyst is sensed via a temperature sensor arranged in an exhaust passage downstream of the catalyst relative to a direction of exhaust flow.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   an engine comprising a twin-scroll turbocharger upstream of a catalyst relative to a direction of exhaust gas flow;
   a bypass configured to route exhaust gas away from the twin-scroll turbocharger;
   a plurality of vanes configured to adjust an inlet size of a first scroll and a second scroll of the twin-scroll turbocharger; and
   a controller comprising computer-readable instructions that when executed enable the controller to:
      adjust a position of a bypass valve to an open position and the plurality of vanes to a closed position in response to a catalyst temperature being less than a threshold temperature; and
      adjust a fuel injection volume in response to the bypass valve being open and the plurality of vanes being closed when the catalyst temperature is less than the threshold temperature.

2. The system of claim 1, wherein the plurality of vanes includes a plurality of first vanes configured to adjust the inlet size of the first scroll and a plurality of second vanes configured to adjust the inlet size of the second scroll.

3. The system of claim 2, wherein the instructions enable the controller to close the plurality of first vanes and the plurality of second vanes in response to the catalyst temperature being less than the threshold temperature.

4. The system of claim 2, wherein the bypass valve is arranged in the bypass, and wherein the bypass branches off an exhaust manifold segment upstream of a first exhaust gas entry path configured to flow exhaust gases to the first scroll.

5. The system of claim 4, wherein an exhaust gas recirculate passage branches from a second exhaust gas entry path configured to flow exhaust gases to the second scroll.

6. The system of claim 1, wherein the instructions further enable the controller to adjust the bypass valve to a closed position and the plurality of vanes to an open position in response to a turbine temperature being higher than an upper turbine temperature and the catalyst temperature being less than the threshold temperature.

7. A method for operating an engine, comprising:
   flowing exhaust through a first scroll of a turbocharger;
   flowing exhaust through a second scroll of the turbocharger; and
   flowing exhaust through a turbine bypass passage of the turbocharger in response to a temperature of a catalyst via adjusting a position of turbine nozzle vanes of one or more of the first scroll and the second scroll and a position of a turbine bypass valve, further comprising adjusting a fuel injection volume or a fuel injection timing.

8. The method of claim 7, wherein flowing exhaust through the turbine bypass passage comprises actuating the turbine bypass valve to an open position.

9. The method of claim 7, wherein adjusting the position of turbine nozzle vanes of one or more of the first scroll and the second scroll includes adjusting one or more of a plurality of first nozzle vanes and a plurality of second nozzle vanes to an open position based on the temperature of the catalyst and a boost demand.

10. The method of claim 7, wherein flowing exhaust through the turbine bypass passage comprises adjusting a throttle position and an exhaust gas recirculate (EGR) valve position, wherein the throttle position is adjusted to a minimum open setpoint position of a range of positions based on a desired air/fuel ratio and a desired EGR flow rate.

11. The method of claim 7, wherein flowing exhaust through the turbine bypass passage includes where the temperature of the catalyst is less than a threshold temperature.

12. The method of claim 11, further comprising transitioning from flowing exhaust through the turbine bypass passage to blocking exhaust from flowing through the turbine bypass passage in response to the temperature of the catalyst being greater than or equal to the threshold temperature.

13. An engine system, comprising:
an engine comprising a first group of cylinders configured to flow exhaust gases to a first scroll of a turbine and a second group of cylinders configured to flow exhaust gases to a second scroll of the turbine;
a turbine bypass passage comprising a bypass valve configured to adjust an amount of exhaust gases bypassing from the first and second scrolls; and
a controller with computer-readable instructions that when executed enable the controller to:
flow exhaust gas from the first group of cylinders to the first scroll and from the second group of cylinders to the second scroll in response to a temperature of a catalyst being greater than or equal to a threshold temperature; and
bypass exhaust gas via opening the bypass valve and adjusting a position of turbine nozzle vanes of one or more of the first scroll and the second scroll in response to the temperature of the catalyst being less than the threshold temperature, and adjusting a fuel injection timing.

14. The engine system of claim 13, wherein the instructions further enable the controller to bypass exhaust gas from only the first group of cylinders by actuating a plurality of first vanes of the first scroll to a closed position, and where exhaust gas from the second group of cylinders flows to the second scroll via a plurality of second vanes in an open position.

15. The engine system of claim 13, wherein the instructions further enable the controller to determine an air/fuel ratio entry condition is met prior to opening the bypass valve, wherein the air/fuel ratio entry condition is based on a combustion stability and an emission limit.

16. The engine system of claim 15, wherein the instructions further enable the controller to determine a throttle position range based on the air/fuel ratio entry condition, an engine speed, and an engine load, and wherein the instructions further enable the controller to signal to an actuator to adjust the throttle position to a least open position of the throttle position range.

17. The engine system of claim 13, wherein the instructions further enable the controller to block exhaust gas from bypassing the turbine in response to the temperature of the catalyst being greater than or equal to the threshold temperature, wherein the temperature of the catalyst is sensed via a temperature sensor arranged in an exhaust passage downstream of the catalyst relative to a direction of exhaust flow.

* * * * *